Patented Oct. 16, 1934

1,977,253

UNITED STATES PATENT OFFICE 1,977,253

EPICHLORHYDRIN-AMINE CONDENSATION PRODUCT

Otto Stallmann, South Milwaukee, Wis., assignor to E. I. du Pont de Nemours & Company, Wilmington, Del., a corporation of Delaware No Drawing. Application May 12, 1933, Serial No. 670,748

12 Claims. (Cl. 260—127)

This invention relates to novel compositions of matter. It is an object of this invention to produce new organic compounds or compositions of matter which are useful in the dyeing and printing arts. Other and further important objects of this invention will appear as the description proceeds.

My novel compounds are water-soluble epichlorhydrin-amine condensation products, and are most probably secondary amine compounds having the empirical formula

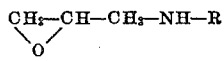

wherein R is the organic residue of a water-soluble primary amine. More particularly, R represents an alkyl or aralkyl radical, or an aryl radical which is further substituted by a solubility imparting group, such as COOH, SO$_3$H or their salts. My invention also comprises the salts derivable from the above secondary amines by neutralizing the same with an inorganic or organic acid.

I prepare my novel compounds by reacting epichlorhydrin with a water-soluble primary amine. The latter may be an alkyl-amine, an aralkylamine, or an arylamine which carries solubilizing groups. In the term alkylamine I include substituted alkyl amines, such as alkanol amines. It appears that the water-solubility of the reaction product depends on the solubility of the primary amine selected for the reaction. It is therefore advisable to employ as initial material such primary amines as are characterized by high solubility. Whether the latter property is due to a particular configuration of the carbon atoms, or to the presence of solubilizing groups appears to make little difference.

In general, reaction may be effected by merely bringing the two reactants together in a suitable solvent or suspending medium. Alcohol makes an excellent solvent for the epichlorhydrin, but an aqueous emulsion thereof may also be used with great success. The amine is preferably entered slowly into the epichlorhydrin mass, in order to avoid violent reaction. In the case of a volatile amine such as methylamine, it may be circulated in the form of gas over the surface of the epichlorhydrin solution. Other amines are dripped in directly or in the form of their aqueous solution.

The reaction is apparently equimolecular, and it is therefore best to employ stoichiometric proportions. Excesses of either reactant, however, may be used without complications.

A slightly elevated temperature increases the speed of reaction, but is not essential. Temperatures above the reflux point of the mixture should be avoided, to avoid formation of gummy by-products.

The immediate reaction product appears to be the hydrochloride of the secondary amine as above indicated. The free base may be obtained by neutralizing the reaction mass with alkali.

My novel reaction products are highly hygroscopic syrup-like masses, which solidify to resin-like products when cold and completely dry. They are readily soluble in water and alcohol in all proportions. Their aqueous solution is strongly basic, almost as strongly as dilute caustic soda solution. They form readily neutral salts with various inorganic and organic acids, such as hydrochloric, sulfuric and phosphoric acid or sulfonic acids of the benzene, naphthalene or anthracene series. The hydrochlorides resemble in physical properties the free bases, and like the latter are highly useful as assistants for printing pastes containing vat dyestuffs of the indanthrone series.

The exact formula of my new epichlorhydrin-amine condensation products is not known, although they are believed to be secondary amines having the formula as above given, or polymerization products thereof. Wherever in the specification or claims of this application formulæ are given, it is to be understood that such formulæ are merely representative of the possible structure of these compounds, based on the manner in which they are synthesized and on the chlorine and nitrogen analysis of the resulting products, and such formulæ are not to be used as limitations upon the scope of my invention.

Without limiting my invention to any particular procedure, the following examples are given to illustrate my preferred mode of operation. Parts mentioned are by weight.

*Example 1*

92 parts of epichlorhydrin and 736 parts of technical denatured ethyl alcohol are heated to 65–70° C. and a slow stream of monomethylamine gas (CH$_3$.NH$_2$) is allowed to pass over the surface of the agitated solution for a period of 14 hours, keeping the temperature at 65–70° C. There are then added about 400 parts of a 10% alcoholic caustic soda solution until the mass is distinctly and permanently alkaline to thymol phthaleine paper, whereupon the temperature is allowed to drop to room temperature and the sodium chloride is removed by a filtration. The filtrate is evaporated to dryness, in the final stages at 100° C. in vacuo, and the residue is stirred to a syrup-like solution with 20% of its weight of hot water.

The product resembles in appearance and properties the epichlorhydrin-ammonia reaction product producible under similar conditions (Example 1 of copending application Ser. No. 670,746, filed of even date herewith). Like the latter it is excellently adapted for use as an assistant for printing pastes containing vat dyestuffs of the indanthrone series, and when so used increases the tinctorial strength of the dyestuff and produces bright and even prints.

According to the nitrogen analysis, one mole of epichlorhydrin has evidently reacted with one mole of methylamine, forming a secondary amine which is free of organic-bound chlorine. The reaction most probably proceeds along the following lines:

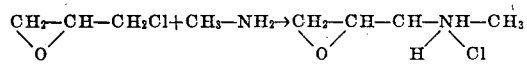

In the neutralization step with alcoholic alkali, the HCl group is split off, leaving the free base

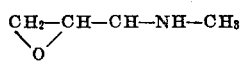

which may be termed epihydrin-methyl-amine.

If desired, the neutralization step may be omitted, and the reaction mass evaporated directly to give epihydrin-methyl-amine-hydrochloride. Alternatively, the hydrochloride may also be formed, by first isolating the base and then reacting the same in aqueous solution with hydrochloric acid, followed by evaporation to the desired consistency or to dryness. The latter method is applicable also for the preparation of other salts, such as the phosphate or anthraquinone-sulfonate.

Example 2

92 parts of epichlorhydrin and 400 parts of water are heated under vigorous agitation to 65-70° C. until thoroughly mixed and emulsified. There are then dropped in 200 parts of a 20% monomethylamine-water solution within a period of 1½ hours, keeping the temperature at 65-70° C. The emulsion turns into a clear solution, and this is then heated for another hour to 65-70° C. and then for one hour to 95° C. The solution is then evaporated under vacuum to dryness, raising the temperature finally to 100° C. The syrup-like residue is the hydrochloride of the product obtained in Example 1. It displays good printing assistant properties, when used in color pastes as described below.

Example 3

92 parts of epichlorhydrin and 736 parts of technical denatured alcohol are heated to 65-70° C. There are then dropped into this solution, under agitation, 61 parts of monoethanolamine (CH₂—OH—CH₂—NH₂), within a period of 1 to 2 hours, keeping the temperature at 65-70° C. The solution is then kept at reflux (about 75-80° C.) for 3 hours, cooled to 65° C. and treated at this temperature with about 400 parts of a 10% alcohol caustic soda solution until the mass is distinctly alkaline to thymol phthaleine paper. There are then distilled off about 400 parts of the alcohol; the residue is filtered; and the filtrate is evaporated to dryness at a final temperature of 100° C. in vacuo. The residual syrup-like residue is an efficient printing assistant when used in combinations with color pastes as described below. According to its nitrogen analysis it has most probably the following chemical constitution:

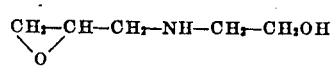

The hydrochloride of this assistant may be prepared according to the same procedure as described in Example 2, using 61 parts of monoethanolamine instead of the aqueous monomethylamine solution employed in that example.

Example 4

92 parts of epichlorhydrin and 736 parts of technical denatured alcohol are heated to 65° C. There are then dropped in at 65-70° C. 100 parts of a 60% ethylene-diamine water solution (NH₂.CH₂—CH₂.NH₂) within a period of 1 to 2 hours, keeping the temperature at 65-70° C. The solution is then heated for 1 hour to gentle reflux (75-80° C.) and then cooled to 60° C., whereupon about 400 parts of a 10% alcoholic caustic soda solution is added, until a distinct alkalinity on thymol phthaleine paper is obtained. 400 parts of the alcohol are then distilled off, the precipitated sodium chloride is filtered off, and the filtrate is evaporated to dryness at a final temperature of 100° C., in vacuo. The syrup-like residue is a valuable printing assistant. According to its nitrogen content one mole of ethylene diamine has reacted with 2 moles epichlorhydrin, forming most probably a compound of the formula:

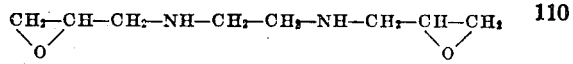

which may be called diepihydrin-ethylene-diamine.

The hydrochloride of this product may be obtained either by neutralizing the strongly alkaline reacting base with hydrochloric acid or by following the procedure described in Example 2 except using 50 parts of a 60% ethylene diamine water solution instead of the monoethanolamine solution employed in Example 2.

Example 5

92 parts of epichlorhydrin and 400 parts of water are heated under vigorous agitation to 65-70° C. There are then dropped in within a period of 1½ hours 152 parts of a 60% glucamine-water solution, keeping the temperature at 65-70° C. The solution is then stirred for another 10 hours at 65-70° C., the clear solution is poured off from a small amount of insoluble material and evaporated under vacuum to dryness at a final temperature of 100° C. The residual syrup-like residue is most probably the hydrochloride of the compound:

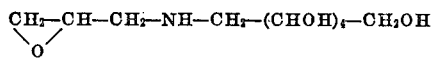

It displays valuable assistant properties in prints, when used as described below.

Example 6

60 parts of anthranilic acid are dissolved in 100 parts of water and about 17 parts of caustic soda, adjusting the alkalinity to very slight alkalinity on brilliant yellow paper.

This solution is dropped into an emulsion of 40 parts of epichlorhydrin and 100 parts of water over a period of 1½ hours, keeping the temperature at 75-80° C. and stirring the reaction mass vigorously. The mass is then stirred for another 14 hours at about 80° C. and acidified with hydrochloric acid, precipitating the reaction product out of solution in form of a soft gummy mass. The gummy mass is isolated and washed twice with warm water, and then dissolved in 500 parts of dilute caustic soda solution, adjusting the alkalinity to just alkaline to brilliant yellow paper. The clear solution is poured off from a small amount of insoluble gummy residue and evaporated to dryness at a final temperature of 100° C. under vacuum. Into the semi-solid residue are stirred in about 20 parts of water until a clear syrup-like liquid is obtained, which displays valuable printing assistant properties, when used as described below.

Numerous variations are possible in the method of preparing the novel assistants, as will be readily understood by those skilled in the art.

In the amidation step the temperature may be lowered under 50° C., allowing a longer reaction time for completion of the reaction, or again a higher temperature, for instance, reflux temperature (75–80° C.) may be employed for a shorter time. It has been found, however, that higher temperatures at this stage of the reaction favor the formation of a gummy by-product which is insoluble in alcohol and water, and consequently lower the yield of usable assistant.

In the step of basing the hydrochlorides with a suitable alkali, the temperature at which this reaction is carried out, may be chosen at will. 60–70° C. was preferred in the above examples because at this temperature the sodium chloride is formed in large crystals which will settle and can be filtered off readily. Aside from this point, however, any other temperature may be used. Other alkalies, such as potassium hydroxide or such sodium or potassium salts which act like caustic in alcoholic solution may be employed, as for instance sodamide ($NaNH_2$).

The amounts of alcohol or water used may be varied within wide limits, and other solvents such as methyl, propyl, or butyl alcohol may be used.

Instead of using pure, distilled epichlorhydrin, the crude, wet product obtained from crude dichlorhydrin and lime may be used successfully.

Many other variations and modifications are possible in my preferred procedure above set forth, without departing from the spirit of this invention.

I claim:
1. The reaction product of epichlorhydrin and a water-soluble primary amine.
2. The water-soluble reaction product of epichlorhydrin and a water-soluble primary amine.
3. A compound of the group consisting of the reaction product of epichlorhydrin and a monoalkylamine and addition salts of such product.
4. A compound of the group consisting of the reaction product of epichlorhydrin and a monoalkanolamine and addition salts of such product.
5. The water-soluble reaction product of epichlorhydrin and monomethylamine.
6. A water-soluble reaction product of epichlorhydrin and monoethanolamine.
7. The process of producing a water-soluble epichlorhydrin-amine condensation product, which comprises reacting epichlorhydrin with a water-soluble primary amine.
8. The process of producing a water-soluble epichlorhydrin-amine condensation product which comprises reacting epichlorhydrin with an amine of the general formula $R-NH_2$, wherein R is an alkyl radical, or an aryl radical which is further substituted by a solubilizing group.
9. The process of producing a water-soluble epichlorhydrin-amine condensation product, which comprises reacting epichlorhydrin with a mono alkyl amine.
10. The process of producing a water-soluble epichlorhydrin-amine condensation product, which comprises reacting epichlorhydrin with a mono alkanol amine.
11. The process of producing a water-soluble epichlorhydrin-amine condensation product, which comprises bringing together epichlorhydrin and a primary alkylamine at temperatures between 65 and 80° C., neutralizing the reaction mass with alkali, and recovering the reaction product in the form of free base.
12. The process of producing a water-soluble epichlorhydrin-amine condensation product, which comprises reacting epichlorhydrin with a water soluble primary amine, neutralizing the reaction mass with alkali to form the free base of the reaction product, recovering the latter, and reacting the same with an acid to form a neutral addition salt.

OTTO STALLMANN.